United States Patent [19]
Tsukamoto et al.

[11] Patent Number: 5,605,516
[45] Date of Patent: Feb. 25, 1997

[54] OIL PRESSURE CONTROLLER OF AUTOMATIC TRANSMISSION

[75] Inventors: Kazumasa Tsukamoto, Toyota; Masahiko Ando, Okazaki; Akira Fukatsu, Anjo; Tsuyoshi Mikami, Toyota; Masato Kaigawa, Toyota; Kagenori Fukumura, Toyota; Hidehiro Oba, Numazu; Yasuo Hojo, Nagoya; Atsushi Tabata, Okazaki; Nobuaki Takahashi, Toyota, all of Japan

[73] Assignees: Aisin AW Co., Ltd.; Toyota Jidosha Kabushiki Kaisha, both of Japan

[21] Appl. No.: 562,387

[22] Filed: Nov. 24, 1995

[30] Foreign Application Priority Data

Dec. 2, 1994 [JP] Japan .................................. 6-329493

[51] Int. Cl.⁶ .................................................. F16H 61/00
[52] U.S. Cl. .................................................. 475/128
[58] Field of Search .................................... 475/127, 128

[56] References Cited

U.S. PATENT DOCUMENTS 4,765,202  8/1988  Hayasaki ................................ 475/127
4,991,464  2/1991  Ishikawa et al. ........................ 74/866

FOREIGN PATENT DOCUMENTS 6-341522  3/1993  Japan .

*Primary Examiner*—Dirk Wright
*Attorney, Agent, or Firm*—Lorusso & Loud

[57] ABSTRACT

An oil pressure controller of an automatic transmission which is capable of supplying engaging pressures to hydraulic servos of two frictional engaging elements which require different engaging pressures by a single pressure governing valve with a good pressure governing accuracy. The oil pressure controller comprises a hydraulic power source (10), hydraulic servos (70 and 80), signal pressure generating means (20), a pressure governing valve (30) for governing an oil pressure ($P_s$) from the hydraulic power source (10) by a signal pressure ($P_{ACC}$) and a control valve (40). The pressure governing valve (30) has a pressure receiving face $A_1$ to which the signal pressure is applied, a pressure receiving face $A_2$ to which the engaging pressure ($P_s$) is fed back in the opposite direction and a pressure receiving face ($A_3$) for selecting whether the feedback of the engaging pressure is present or not in order to change the control gain of the pressure governing valve (30) in response to the change of the control valve (40) for selecting the hydraulic servo (70 or 80) to which the oil pressure is supplied.

6 Claims, 5 Drawing Sheets

| POSITION | | | CLUTCH | | | BRAKE | | | | | OWC | | |
|---|---|---|---|---|---|---|---|---|---|---|---|---|---|
| | | | C-1 | C-2 | C-0 | B-1 | B-2 | B-3 | B-4 | B-0 | F-1 | F-2 | F-0 |
| R | | | × | ○ | ○ | × | × | × | × | × | × | × | ○ |
| | O/D Controlled | | × | ○ | × | × | × | × | ○ | ○ | × | × | × |
| | Prohibited | | × | × | × | × | × | × | × | ○ | × | × | × |
| D | 1ST | Normal | ○ | × | ○ | × | × | × | × | × | × | ○ | ○ |
| | | E/G Brake | ○ | × | ○ | × | × | × | ○ | × | × | ○ | ○ |
| | 2ND | Normal | ○ | × | × | × | × | ○ | × | × | × | × | ○ |
| | | E/G Brake | ○ | × | ○ | × | × | ○ | × | × | × | × | ○ |
| | 3RD | Normal | ○ | × | ○ | × | ○ | × | × | × | ○ | × | ○ |
| | | E/G Brake | ○ | × | ○ | ○ | ○ | × | × | × | ○ | × | ○ |
| | 4TH | | ○ | ○ | ○ | × | ○ | × | × | × | × | × | ○ |
| | 5TH | | ○ | ○ | × | × | ○ | × | × | ○ | × | × | × |

5,605,516

OIL PRESSURE CONTROLLER OF AUTOMATIC TRANSMISSION

BACKGROUND OF THE INVENTION

1. Field of the Invention

The present invention relates to an oil pressure controller of an automatic transmission and more particularly to an oil pressure controller for governing pressures supplied to hydraulic servos for engaging/releasing frictional engaging elements within a gear train of an automatic transmission.

2. Description of the Related Art

A plurality of frictional engaging elements are disposed in association with each element of planetary gears within a gear train of an automatic transmission. Japanese Patent Laid-open No. Hei. 1-242857 has disclosed an exemplary technology wherein private pressure governing valves are provided respectively for hydraulic servos of two different frictional engaging elements to control pressures supplied to the hydraulic servos for engaging/releasing such frictional engaging elements. In the example, a pressure governing valve for governing an oil pressure supplied to a hydraulic servo of a brake (B-3) engaged when a 1ST engine brake is attained and another pressure governing valve for governing an oil pressure supplied to a hydraulic servo of a brake (B-1) engaged when a 2ND engine brake is attained are provided separately.

Governing the oil pressures ($P_{B-3}$, $P_{B-1}$) necessary for engaging the respective frictional engaging elements by their private pressure governing valves, with thier solenoid pressures as signal pressures, allows a control gain of a pressure governed output (brake pressure ($P_B$)) with respect to the signal pressure (accumu-control pressure ($P_{ACC}$)) applied to the pressure governing valve, i.e. a change ($dP_B$) of the brake pressure ($P_B$) with respect to a change ($dP_{ACC}$) of the accumu-control pressure ($P_{ACC}$), to be set individually, so that the brake pressure ($P_{B-3}$) which requires a low pressure may be governed accurately by lowering the control gain.

However, the prior art technology has had a problem that it is not compact because the respective private pressure governing valves have to be disposed within the valve body of the oil pressure controller. Then, the applicants of the present invention have proposed a technology for governing pressures supplied to two frictional engaging elements by one pressure governing valve to improve the compaction in the prior application (see Japanese Patent Laid-open No. Hei. 5-156395).

In the structure of the above-mentioned proposal, a control gain ($dP_{ACC}/dP_B$) of the pressure governing valve is fixed with respect to the both hydraulic servos, so that when it is applied to hydraulic servos wherein oil pressures necessary for engaging respective frictional engaging elements are different more or less and when the control gain is adjusted to a gain suitable for the lower pressure, the pressure supplied to the hydraulic servo cannot be raised to the engaging pressure of the frictional engaging element which requires the higher engaging pressure, causing a slip in the frictional engaging element. Further, when the control gain is adjusted to a gain suitable for governing the higher pressure ($P_{B-1}$) as shown in FIG. 5, the control gain becomes too large when the pressure ($P_{B-4}$) supplied to the hydraulic servo of the frictional engaging element whose engaging pressure is lower is controlled and an output pressure ($dP_B$) varies significantly with a slight change of the signal pressure ($dP_{ACC}$), so that the variation of the output pressure with respect to the variation of the signal pressure increases, degrading the pressure governing accuracy.

The present invention has been devised in view of such circumstance and it is an object of the present invention to provide an oil pressure controller of an automatic transmission which is capable of supplying engaging pressures to hydraulic servos of frictional engaging elements which require different engaging pressures with a good pressure governing accuracy while improving the compaction by unitizing the pressure governing valve.

SUMMARY OF THE INVENTION

In order to achieve the above-mentioned object, an oil pressure controller of an automatic transmission of the present invention comprises a hydraulic power source; a first hydraulic servo; a second hydraulic servo; signal pressure generating means for generating a signal pressure; a pressure governing valve for governing an oil pressure from the hydraulic power source by the signal pressure; and a directional control valve, disposed between the pressure governing valve and the first hydraulic servo and second hydraulic servo, for selectively supplying the oil pressure from the pressure governing valve to the first or second hydraulic servo. The pressure governing valve has a first pressure receiving face to which the signal pressure is applied in one direction; a second pressure receiving face to which the oil pressure supplied from the pressure governing valve to the control valve is applied in another direction; and a third pressure receiving face to which the oil pressure supplied from the control valve to the first hydraulic servo is applied in the other direction or the oil pressure supplied from the control valve to the second hydraulic servo is applied in the one direction.

The pressure governing valve comprises a plunger on which the first pressure receiving face or the first and third pressure receiving faces are created; a spool disposed coaxially with the plunger and on which the second and third pressure receiving faces or only the second pressure receiving face is created; a first elastic member disposed between the plunger and the spool; and a second elastic member disposed coaxially on the opposite side from the first elastic member at the plunger.

The spool has a first land on which the second pressure receiving face is created; and a second land whose diamter is smaller than the first land and on which the third pressure receiving face is created.

The first hydraulic servo is supplied with the oil pressure in a first gear shifting step and engages a frictional engaing element which is to be engaged in the first gear shifting step and the second hydraulic servo is supplied with the oil pressure in a second gear shifting step which is different from the first gear shifting step and engages a frictional engaing element which is to be engaged in the second gear shifting step. The directional control valve is a gear shift control valve for changing over the first gear shifting step and second gear shifting step.

In the oil pressure controller constructed as described above, when the oil pressure supplied from the control valve to the first hydraulic servo is applied to the third pressure receiving face of the pressure governing valve in the other direction, the pressure may be governed and controlled for the first hydraulic servo by a small control gain caused by the oil pressure supplied from the pressure governing valve to the control valve and applied to the second pressure receiving face of the pressure governing valve in the other direction and the oil pressure supplied from the control valve to the first hydraulic servo and applied to the third pressure receiving face of the pressure governing valve in the other direction. For the second hydraulic servo, the pressure is governed and controlled by a large control gain caused by the oil pressure supplied from the pressure governing valve to the control valve and applied to the second pressure receiving face of the pressure governing valve. In contrast, when the oil pressure supplied from the control valve to the second hydraulic servo is applied to the third pressure receiving face of the pressure governing valve in one direction, the pressure may be governed and controlled for the first hydraulic servo by a small control gain caused by the oil pressure supplied from the pressure governing valve to the control valve and applied to the second pressure receiving face of the pressure governing valve in the other direction. Further, for the second hydraulic servo, the pressure may be governed and controlled by a large control gain caused by the oil pressure supplied from the control valve to the second hydraulic servo and applied to the third pressure receiving face of the pressure governing valve in one direction and the oil pressure supplied from the pressure governing valve to the control valve and applied to the second pressure receiving face of the pressure governing valve in the other direction.

According to the present invention, the pressures supplied to the hydraulic servos of the frictional engaging elements which require different engaging pressures, respectively, may be thus controlled by the single pressure governing valve with a good pressure governing accuracy whale maintaining the compaction.

Further, according to the present invention, the first hydraulic servo and the second hydraulic servo correspond frictional engaging elements which engage respectively at the first and second gear shifting steps and the control valve is a gear shift control valve which is changed over between the first and second gear shifting steps, so that a relationship between the supply of oil pressure to either hydraulic servo, ensuing from the change of the gear shift control valve, and the oil pressure applied to the third pressure receiving face of the pressure governing valve is defined uniquely.

Therefore, the supply of the oil pressure to the both hydraulic servos and the application of the oil pressure to the third pressure receiving face of the pressure governing valve becomes consistent and the pressure governing state of the pressure governing valve always fits with the hydraulic servo to which the oil pressure is to be supplied. That is, the characteristic to be governed always coincides with the frictional engaging element which corresponds to the characteristic. Thereby, the construction of the present invention provides a fail-safe effect. Further, because the oil pressure in the oil path from the control valve to respective hydraulic servo is used as the feedback pressure to the third pressure receiving face, so that the pressure is governed with the oil pressure which is close to the actual oil pressure of the hydraulic servo, giving an effect that the pressure governing accuracy is improved further The above and other related objects and features of the invetion will be apparent from a reading of the following description of the disclosure found in the accompanying drawings in which like numerals refer to like parts.

DETAILED DESCRIPTION OF PREFERRED EMBODIMENT

Preferred embodiments of the present invention will be explained below with reference to the drawings. While an oil pressure controller of the present embodiment supplies oil pressures to hydraulic servos of two frictional engaging elements which require different engaging pressures and which are assumed to be frictional engaging elements for attaining engine brakes, a gear train in which the frictional engaging elements for attaining the engine brakes are disposed will be explained first prior to the explanation of the oil pressure controller itself.

Figure 2:
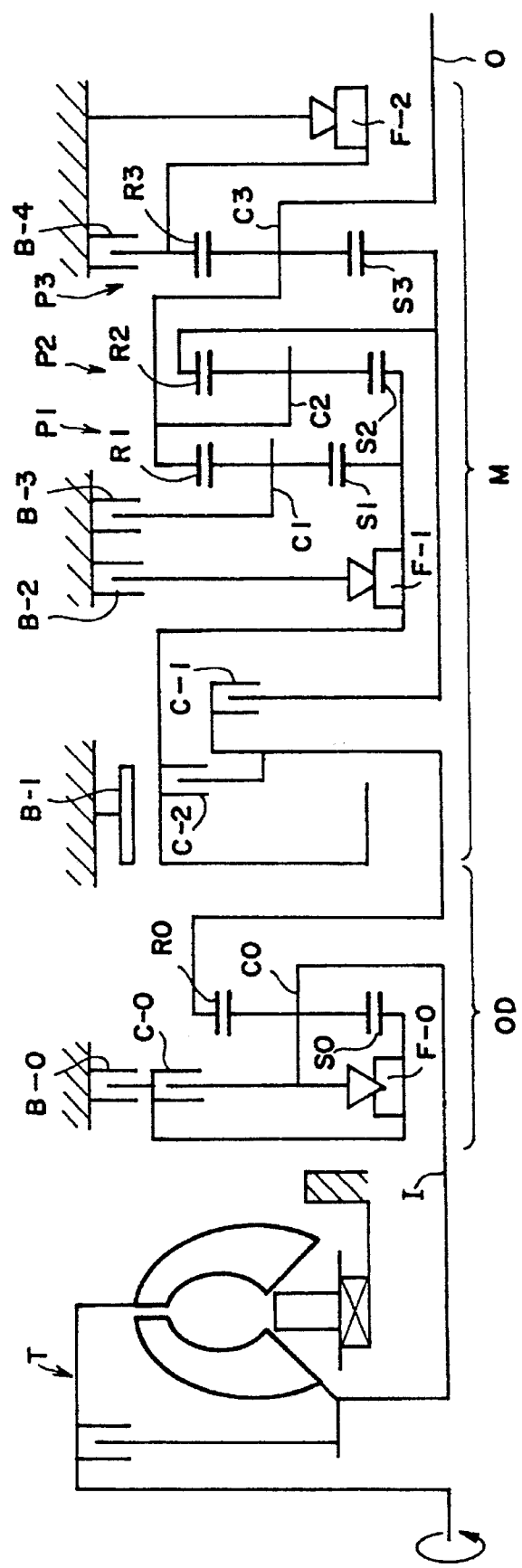
FIG. 2 is a skeleton diagram of a gear train including frictional engaging elements controlled by the oil pressure controller.

FIG. 2 shows a skeleton of the gear train of the automatic transmission. This gear train is a five-speed change gear mechanism in which a front-end sub-gear shifter OD and a main gear shifter M for four forward speeds and one reverse speed are combined. The change gear mechanism is also equipped with a torque converter T attached with a lockup clutch.

The sub-gear shifter OD is equipped with a first one-way clutch F-0 and a multiple disc clutch C-0 in parallel therewith and a multi-disc brake B-0 in series therewith in association with a sun gear S0, a carrier C0 and a ring gear R0. Meanwhile, the main gear shifter M is equipped with three sets of simply linked gear units P1, P2 and P3 in which each of change gear elements comprising sun gears S1 through S3, carriers C1 through C3 and ring gears R1 through R3, respectively, are appropriately linked and multiple disc clutches C-1 and C-2, a band brake B-1, multiple disc brakes B-2 through B-4, a one-way clutch F-1 and a second one-way clutch F-2 are disposed in association with change gear elements of each gear unit. Note that although not shown, each clutch and brake is equipped with servo means having a piston for engaging and releasing such a frictional engaging element under the control of servo oil pressure.

In the change gear mechanism, an input rotation of an engine not shown is transmitted to an input shaft I of the sub-gear shifter OD via the torque converter T. When the clutch C-0 is engaged to directly couple the sub-gear shifter OD, the clutch C-1 of the main gear shifter M is engaged and the other frictional engaging elements are all released, the rotation of the input shaft I is then input to the sun gear S3 of the gear unit P3 and is output as 1ST speed to an output shaft O from the carrier C3 as the one-way clutch F-2 blocks the ring gear R3 from reversely rotating. Then, when driven reversely from the side of an axle, while the reverse power transmission path is cut off and functioning of the engine brake is released as the one-way clutch F-2 is released, engine brake is obtained when the brake B-4 is engaged in response to a range selection.

Next, 2ND speed is attained when the sub-gear shifter OD is directly coupled and the clutch C-1 and the brake B-3 are engaged. An input inputted to the ring gear R2 of the gear unit P2 is output to the carrier C2 of the gear unit P2 and the ring gear R1 of the gear unit P1 which is directly coupled thereto, with the carrier C1 of the gear unit P1 as a reactionary element. In this case, the power is transmitted through a path reverse to the one described above also in the reverse driving and the reverse driving force from the output shaft O is transmitted to the engine via the input shaft I and the torque converter T through the path reverse to that in the forward driving.

3RD speed is attained when the sub-gear shifter OD is directly coupled, the clutch C-1 and the brake B-2 are engaged and the others are released. At this time, the input inputted to the ring gear R2 of the gear unit P2 is output to the carrier C2, with the sun gear S2 as a reactionary element. During the reverse driving in this case, while the reverse power transmission path is cut off and the engine brake is released when the one-way clutch F-1 is released, engine brake is obtained when the brake B-1 is engaged in response with a range selection.

4TH speed is attained when the sub-gear shifter OD is directly coupled, the clutch C-1 and the clutch C-2 are both engaged and the others are released. At this time, because the input is inputted to the ring gear R2 and the sun gear S2, the gear unit P2 is directly coupled and the input rotation is output as it is. In this case, engine brake is always generated during the reverse driving. 5TH speed is attained by stepping up the rotation of the sub-gear shifter OD by releasing the clutch C-0 and by fixing the sun gear S0 by engaging the brake B-0 in the state wherein the main gear shifter M rotates in 4TH speed as described above.

Reverse is attained by putting the sub-gear shifter OD into the state described above, by engaging the clutch C-2 and the brake B-4 of the main gear shifter M and by releasing all others. At this time, the input inputted to the sun gear S2 of the gear unit P2 is output as reverse rotation of the carriers C2 and C3 of the gear units P2 and P3, with the ring gear R3 as a reactionary element.

Figures 3, 4:
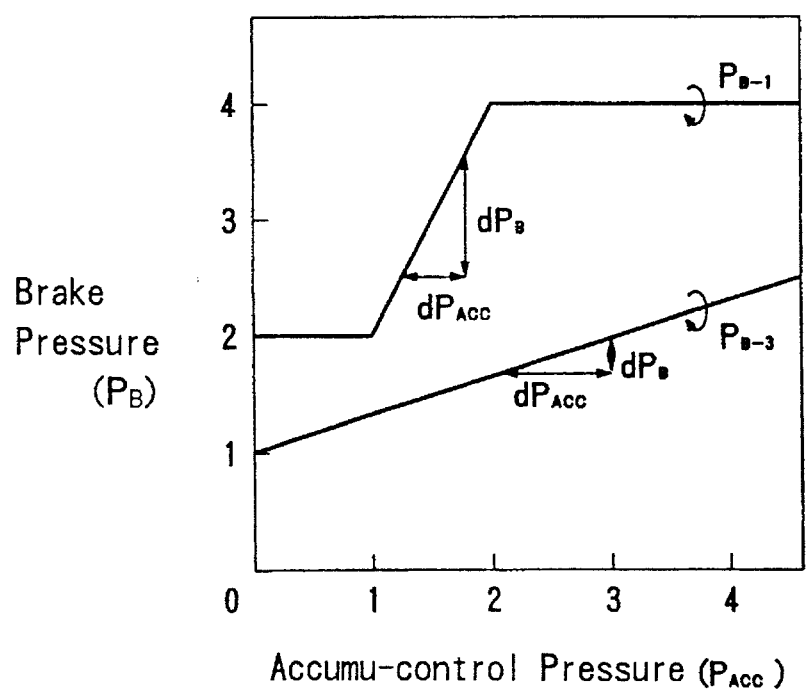
FIG. 3 is a table of gear shifts of the gear train.
FIG. 4 a hydraulic characteristic graph showing a relationship between a solenoid pressure and an engine brake pressure effected by pressure governing valves of a prior art oil pressure controller.
Figure 5:
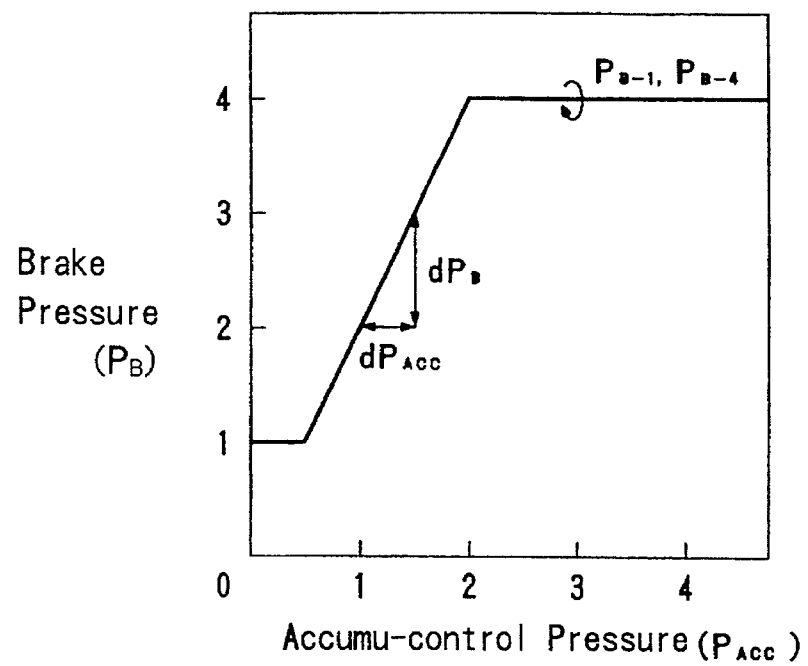
FIG. 5 is a hydraulic characteristic graph showing a relationship between a solenoid pressure and an engine brake pressure effected by a pressure governing valve of a prior application.

The operation of the gear train constructed as described above may be summarized in a table shown in FIG. 3. Each of the gear steps of 1ST through 5TH are attained during the forward driving as the frictional engaging element of each clutch and brake of the change gear mechanism is engaged (indicated by mark O in the table) and is released (indicated by mark X in the table) and in connection with lock (indicated by mark O in the table) and free (indicated by mark X in the table) rotation of the one-way clutches (abbreviated as OWC in the table), and the engine (abbreviated as E/G in the table) brake function is obtained selectively in 1ST through 3RD speeds and always in 4TH and 5TH speeds during the reverse driving.

By the way, because the brake B-4 is used to receive an amplified reactionary torque applied to the rang gear R by engaging when Reverse is attained in the gear train constructed as described above as seen from the operation table in FIG. 3, a number of friction members are increased and a large hydraulic servo is used. Then, if the same oil pressure when Reverse is attained is applied to such large hydraulic servo when 1ST engine brake is attained, the capacity becomes excessive to receive a reactionary torque during the reverse driving which is smaller as compared to that during the forward driving. Therefore, a control for suppressing the supplied pressure low is made when the engine brake is attained. As a result, it becomes necessary to differentiate pressures supplied to the hydraulic servo for the brake B-1 and the hydraulic servo for the brake B-4.

Figure 1:
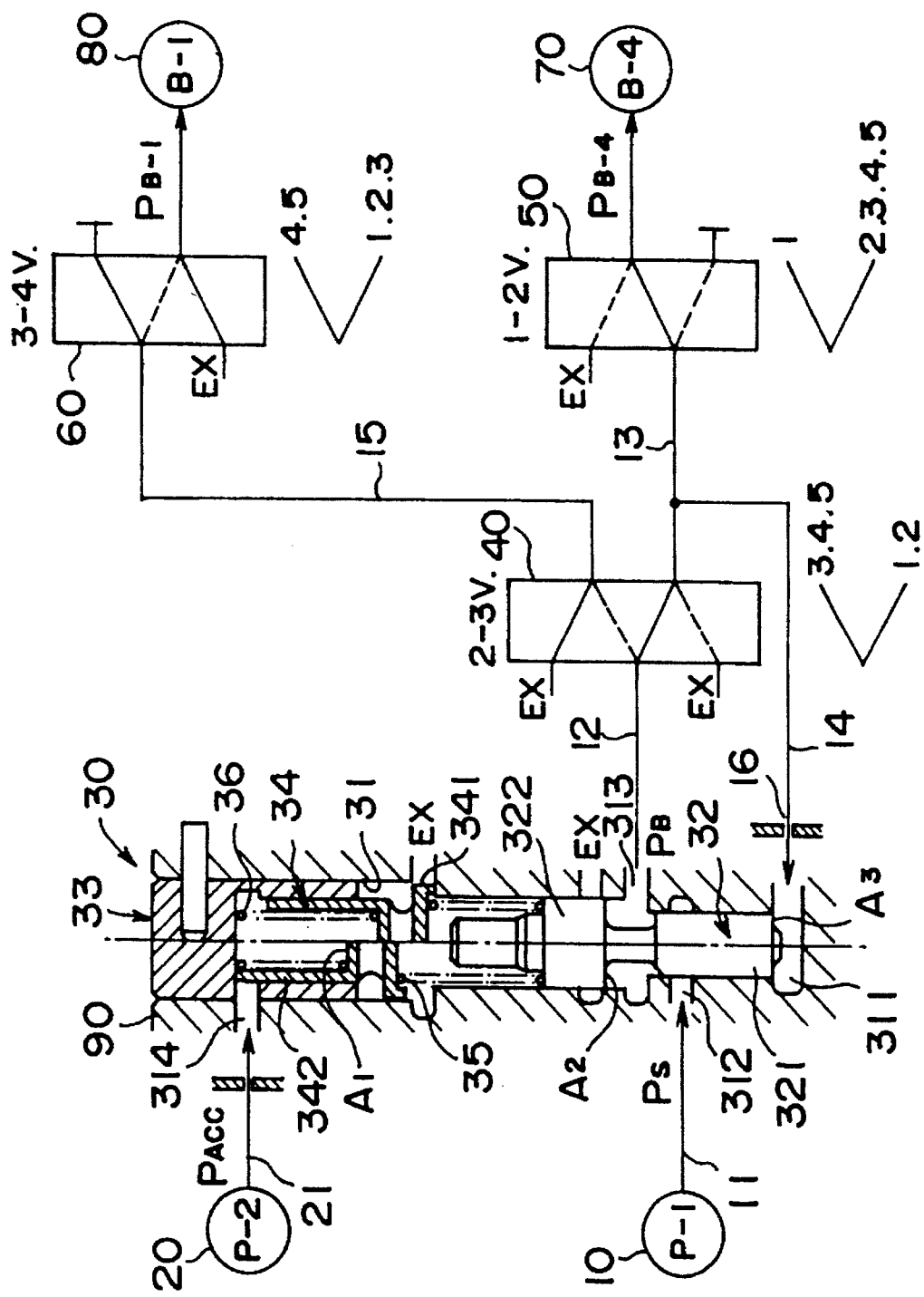
FIG. 1 a simplified hydraulic circuit diagram illustrating a first embodiment of an oil pressure controller of an automatic transmission of the present invention.

FIG. 1 schematically shows an oil pressure supplying circuit of the brake B-4 and the brake B-1 within the gear train described above. The circuit comprises a hydraulic power source 10, a first hydraulic servo 70, a second hydraulic servo 80, signal pressure generating means 20 (specifically a linear solenoid valve) for generating a signal pressure (accumu-control pressure ($P_{ACC}$) in the present embodiment), a pressure governing valve 30 for governing an oil pressure ($P_s$) from the hydraulic power source 10 with the signal pressure ($P_{ACC}$) and a control valve 40, disposed between the pressure governing valve 30 and the first hydraulic servo 70 and the second hydraulic servo 80, for supplying the oil pressure ($P_s$) from the pressure governing valve 30 selectively to the first hydraulic servo 70 or the second hydraulic servo 80.

According to the present invention, the pressure governing valve 30 has a first pressure receiving face $A_1$ to which the signal pressure ($P_{ACC}$) from an oil path 21 is applied in one direction (downward in the figure), a second pressure receiving face $A_2$ to which an oil pressure $P_B$ supplied from the pressure governing valve 30 to the control valve 40 is applied in the other direction (upward in the figure) and a third pressure receiving face $A_3$ to which the oil pressure $P_B$ supplied from the control valve 40 to the first hydraulic servo 70 is applied also in the other direction in the present embodiment. In this example, the first hydraulic servo 70 and the second hydraulic servo 80 correspond to the brake B-4 and the brake B-1 which are frictional engaging elements which engage respectively in different first and second gear shifting steps, i.e. 1ST and 3RD speeds, and the control valve 40 is a gear shift control valve which is changed over between 1ST and 3RD gear shifting steps, i.e. a 2–3 shift valve.

Next, each part thereof will be explained in detail. While the hydraulic power source 10 corresponds to an oil pump (not shown) included in the automatic transmission in a strict sense viewed from the oil pressure controller of the whole automatic transmission, a supply oil path 11 through which a line pressure obtained by governing a discharge pressure of the oil pump by a primary regulator valve is supplied via a manual valve can be considered as the hydraulic power source as far as the control of the two hydraulic servos 70 and 80 are concerned.

The pressure governing valve 30 comprises a stepped spool 32 having two lands 321 and 322 whose diameters are different and which are slidably fitted into across two diameter sections at the deep inside of a three-stepped hole 31, a main body of the valve, which is created through a valve body 90 of the oil pressure controller and whose diameter is reduced as the depth increases, a plunger 34 disposed similarly at the outside large diameter section, slidably fitted within a hole of a plug 33 and is supported by the large diameter section via the plug 33, a spring 35 disposed between the spool 32 and the plunger 34 and a spring 36 disposed between the plug 33 and the plunger 34.

In the stepped hole 31, a feedback oil chamber 311 is created at the deepest end thereof, an input port 312 is opened at a peripheral groove created at the small diameter section, an output port 313 is opened at a peripheral groove created at the stepped section between the small diameter section and the intermediate diameter section and an exhaust port (EX) is opened at a peripheral groove created at the intermediate diameter section. Further, another exhaust port (EX) is opened at a peripheral groove created at a stepped section between the intermediate diameter section and the large diameter section and an input port 314 is opened at the large diameter section.

The spool 32 is slidably disposed within the stepped hole 31 as its land 321 having a smaller diameter is fitted into the small diameter section of the stepped hole 31 and its land 322 having a larger diameter is fitted into the intermediate diameter section of the stepped hole 31. It opens/closes the input port 312 with the inner end of the smaller land 321 and opens/closes the drain port (EX) with the inner end of the largest land 322 to govern a pressure.

The plunger 34 fitted slidably within the hole of the plug 33 is constructed as having a large diameter stopper portion 341 which serves also as a spring seat and a small diameter portion 342 in which a spring housing hole is created. The small diameter portion 342 constitutes the pressure receiving face $A_1$ for receiving the signal pressure ($P_{ACC}$) A plunger supporting hole of the plug 33 communicates with the signal pressure port 314 via the peripheral groove.

The output port 313 is connected to the 2–3 shift valve 40 which is the directional control valve of the present invention via an oil path 12. The oil path 12 is bifurcated at the 2–3 shift valve 40; one is connected to the first hydraulic servo 70 via a 1–2 shift valve 50 through an oil path 13 and the other is connected to the second hydraulic servo 80 via a 3–4 shift valve 60 through an oil path 15. The oil path 13 is bifurcated between the 2–3 shift valve 40 and the 1–2 shift valve 50 and is connected with the feedback oil chamber 311 at the end of the stepped hole 31 via an orifice 16. Note that slant lines and numbers appended at the right edge thereof below each valve in the figure indicate directions of connection of oil paths within the valve and a relationship with gear shifting steps when such connection is made, and the abbreviated symbol EX denotes an exhaust, i.e. drain connection.

In the supply circuit constructed as described above, the oil paths within each control valves 40, 50 and 60 assume a relationship of connection shown by solid lines in the figure, except of the oil paths mentioned within the 3–4 shift valve, when the 1ST engine brake is attained. At this time, while a supplied pressure $P_S$ is supplied to the hydraulic servo 70 as a brake pressure ($P_{B-4}$) by being governed by the pressure governing valve 30 via the oil path 12, the 2–3 shift valve 40, the oil path 13 and the 1–2 shift valve 50, the brake pressure $P_B$ is applied to the pressure receiving face $A_2$ of the larger land 322 at the stepped section of the spool 32 as a first feedback pressure and is also applied to the outer edge face of the smaller land 321 as a second feedback pressure coming from the downstream of the 2–3 shift valve 40 via the orifice 16. Accordingly at this time, because the feedback pressures are applied to the whole area of the larger land of the spool 32, a biased force of the spool 32 against a biased force caused by the signal pressure ($P_{ACC}$) applied to the outer edge of the plunger 34 and the spring 36 becomes larger and a displacement of the spool with respect to the change of the signal pressure ($P_{ACC}$) becomes smaller. Thereby, the brake pressure $P_{B-4}$ becomes small and a pressure governance gain becomes small.

In contrast, the oil paths within each control valves 40, 50 and 60 assume a relationship of connection shown by dotted lines in the figure when the 3RD engine brake is attained. At this time, the supplied pressure $P_S$ is supplied to the hydraulic servo 80 as the brake pressure ($P_{B-1}$) by being governed by the pressure governing valve 30 via the oil path 12, the 2–3 shift valve 40, the oil path 15 and the 3–4 shift valve 60. While the brake pressure $P_B$ is applied to the pressure receiving face $A_2$ of the larger land 322 at the stepped section of the spool 32 as the first feedback pressure, the pressure applied to the outer edge face of the smaller land 321 is drained via the 2–3 shirt valve 40, so that the second feedback pressure is not applied in this case. Accordingly, the feedback pressure at this time is applied to a difference of areas of the larger land 322 and the smaller land 321 of the spool 32. Then, a biased force of the spool 32 against the biased force caused by the signal pressure ($P_{ACC}$) applied to the outer edge of the plunger 34 and the spring 36 becomes smaller and the displacement of the spool with respect to the change of the signal pressure becomes large. The change of the brake pressure ($P_{B-1}$) also becomes large, thereby increasing the pressure governance gain.

Figure 6:
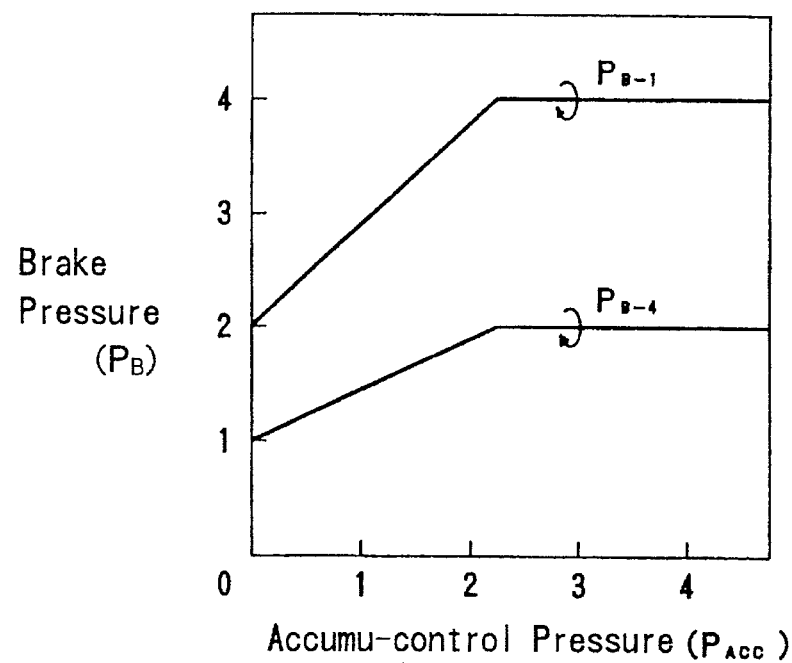
FIG. 6 is a hydraulic characteristic graph showing a relationship between a solenoid pressure and an engine brake pressure effected by the pressure governing valve of the oil pressure controller of the first embodiment.

Thus, the pressure governing valve 30 can have two modes of control gains of high and low corresponding to the pressure values which the both hydraulic servos require as shown in FIG. 6 in response to the change of the control valve 40 disposed downstream thereof. It is needless to say that the specific values of the control gains may be set by setting dimensions or the like of each element of the pressure governing valve 30. Note that the reason why upper limit values of the brake pressures ($P_{B-4}$, $P_{B-1}$) are limited in the figure is because the displacement of the plunger 34 caused by the signal pressure ($P_{ACC}$) stops as a stopper at the inner edge of the plunger 34 abuts with the stepped portion of the hole.

Figure 7:
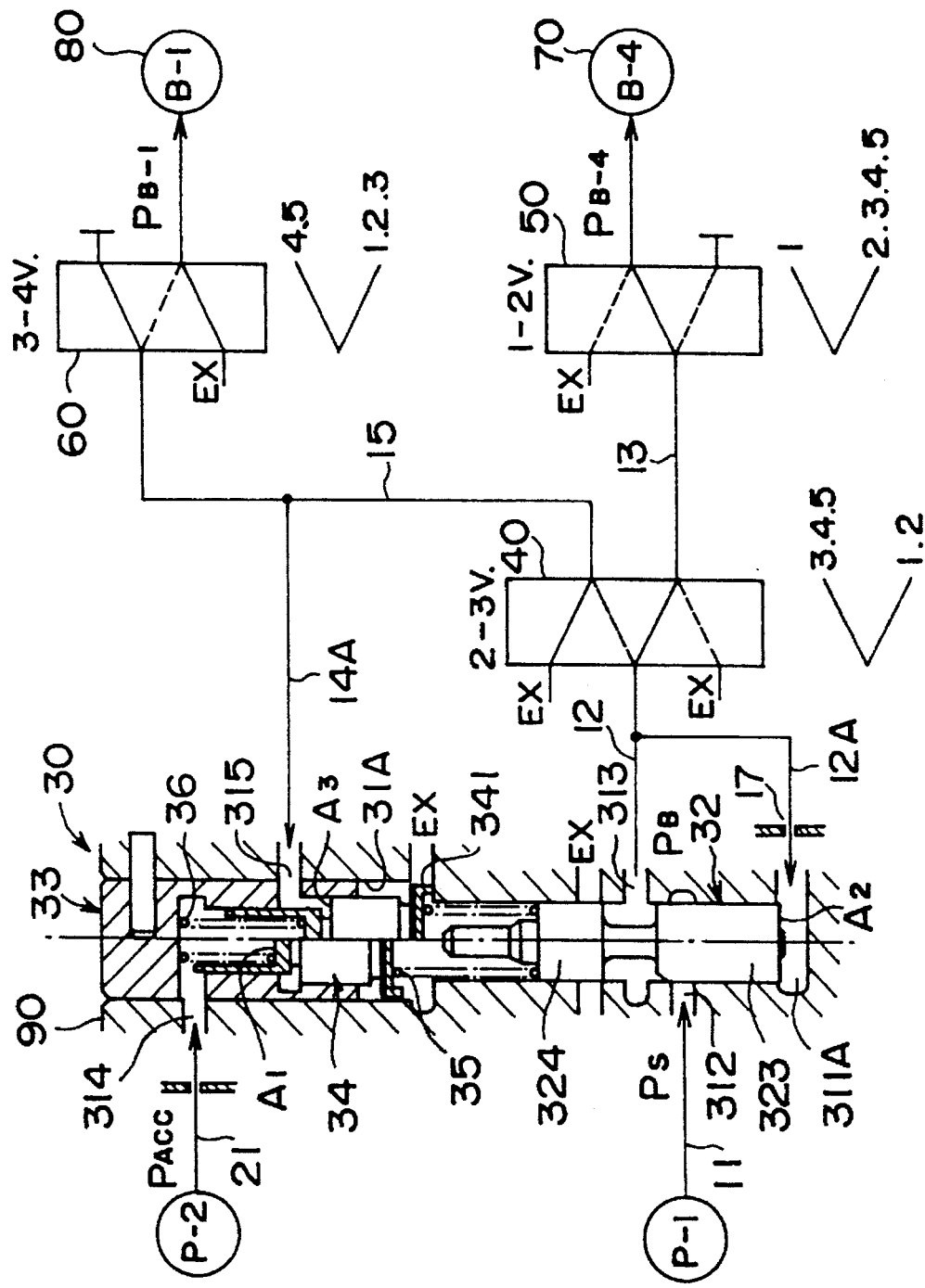
FIG. 7 is a hydraulic circuit diagram illustrating a second embodiment of the present invention.

FIG. 7 shows a second preferred embodiment of the present invention. Differing from the previous embodiment, two lands 323 and 324 of the spool 32 have the same outer diameter because no difference in diameter needs to be provided. With this modification, a stepped hole 31A of the valve body 90 is constructed as a two-stepped hole whose diameter is reduced inside and the first feedback pressure is applied to a feedback oil chamber 311A where the outer edge of the spool 32 is located from an oil path 12A via an orifice 17. Note that although the feedback oil path 12A is drawn as an oil path outside of the valve, it may be an oil path within the valve which serves as an orifice penetrating through the land 323. While these points are not different essentially from the previous embodiment, the present embodiment is characterized in that a second feedback oil path 14A from the downstream of the 2–3 shift valve 40 is connected to the intermediate stepped section of the plunger 34 via a feedback port 315. That is, in the present embodiment, the second feedback pressure is applied in the reverse direction differing from the first embodiment.

In the circuit constructed as described above, the first pressure receiving face $A_1$ to which the signal pressure is applied in one direction is the outside outer diameter face of the plunger 34, similarly to the previous embodiment, the second pressure receiving face $A_2$ to which the oil pressure supplied from the pressure governing valve to the control valve is applied in the other direction is the outer edge face of the land 322 of the spool 32 and the third pressure receiving face $A_3$ to which the oil pressure supplied from the control valve to the second hydraulic servo is the stepped face of the plunger 34. The object of the present invention may be achieved and the same control characteristics as shown in FIG. 6 may be obtained even when such construction of the second embodiment is adopted.

That is, in this supply circuit, the oil paths within each control valves 40, 50 and 60 assume a relationship of connection shown by solid lines in the figure, except of the oil paths mentioned within the 3–4 shift valve, when the engine brake is attained. At this time, a supplied pressure $P_S$ is supplied to the hydraulic servo 70 as a brake pressure ($P_{B-4}$) by being governed by the pressure governing valve 30 via the oil path 12, the 2–3 shift valve 40, the oil path 13 and the 1–2 shift valve 50 and the brake pressure $P_B$ is applied to the pressure receiving face $A_2$ at the outer edge face of the land 323 of the spool 32 as a first feedback pressure via the oil path 12A with the orifice 17.

In contrast, the oil paths within each control valves 40, 50 and 60 assume a relationship of connection shown by dotted lines in the figure when the 3RD engine brake is attained. At this time, the supplied pressure $P_S$ is supplied to the hydraulic servo 80 as the brake pressure ($P_{B-1}$) by being governed by the pressure governing valve 30 via the oil path 12, the 2–3 shift valve 40, the oil path 15 and the 3–4 shaft valve 60 and is applied also to the third pressure receiving face $A_3$ formed by the diameter difference portion of the plunger 34 as a second feedback pressure from the port 315 via an oil path 14A. Accordingly, because a biased force caused by the second feedback pressure in addition to the biased force caused by the signal pressure ($P_{ACC}$) applied to the outer edge of the plunger 34 and the spring 36 confronts with the biased force of the spool 32 caused by the first feedback pressure at this time, the displacement of the spool with respect to the change of the signal pressure becomes large as compared to the case when the 1ST engine brake is attained and the change of the brake pressure ($P_{B-1}$) becomes large, thereby increasing the pressure governance gain.

In short, two feedback pressure receiving faces $A_2$ and $A_3$ are set up in the pressure governing valve 30 and the application and removal of the feedback pressure to one pressure receiving face $A_3$ among them is made automatically in conjunction with the change of the control valve 40 in the hydraulic circuit in the both embodiments described above, so that it provides an advantage that pressure governing values and gains suited respectively for frictional engaging elements of two brakes (B-1, B-4) which require different engaging pressures may be obtained substantially only by setting the shape of the pressure governing valve, dimensions of each part and spring characteristics. Further, because the application and removal of the feedback pressure to the pressure receiving face $A_3$ are made from the oil path 13 or 15 downstream of the 2–3 shift valve 40 which is changed in supplying the oil pressures to the two brakes (B-1, B-4), there is no room to cause an inconsistency between the pressure governing values and gains and the brakes (b-1, B-4) which require them and thereby a fail-safe effect may be obtained. Further, because the pressure governing valve 30 governs the oil pressure by an oil pressure which is close to the actual oil pressure of the both brakes (B-1, B-4) by applying the feedback pressure to the pressure receiving face $A_3$ from the oil path 13 or 15, it provides an advantage that the pressure governing accuracy may be improved further.

Although the present invention has been explained based on the two preferred embodiments thereof, it is not confined only to the constructions thereof and may be practiced by altering the specific construction of each part as necessary within the scope of the present invention described in the following claims.

What is claimed is:

1. An oil pressure controller of an automatic transmission, comprising:

a hydraulic power source;

a first hydraulic servo;

a second hydraulic servo;

signal pressure generating means for generating a signal pressure;

a pressure governing valve for governing an oil pressure sure from said hydraulic power source by said signal pressure; and a directional control valve, disposed between said pressure governing valve and said first hydraulic servo and second hydraulic servo, for selectively supplying the oil pressure from said pressure governing valve to said first or second hydraulic servo:

said pressure governing valve having:

a first pressure receiving face to which said signal pressure is applied in one direction;

a second pressure receiving face to which the oil pressure supplied from said pressure governing valve to said control valve is applied in another direction; and a third pressure receiving face to which the oil pressure supplied from said control valve to said first hydraulic servo is applied in the other direction.

2. The oil pressure controller of the automatic transmission according to claim 1, wherein said pressure governing valve comprising:

a plunger on which said first pressure receiving face is created;

a spool disposed coaxially with said plunger and on which said second and third pressure receiving faces are created;

a first elastic member disposed between said plunger and said spool; and a second elastic member disposed coaxially on the opposite side from said first elastic member at said plunger.

3. The oil pressure controller of the automatic transmission according to claim 2, wherein said spool having:

a first land on which said second pressure receiving face is created; and a second land whose diameter is smaller than said first land and on which said third pressure receiving face is created.

4. An oil pressure controller of an automatic transmission, comprising:

a hydraulic power source;

a first hydraulic servo;

a second hydraulic servo;

signal pressure generating means for generating a signal pressure;

a pressure governing valve for governing an oil pressure from said hydraulic power source by said signal pressure; and a directional control valve, disposed between said pressure governing valve and said first hydraulic servo and second hydraulic servo, for selectively supplying the oil pressure from said pressure governing valve to said first or second hydraulic servo:

said pressure governing valve having:

a first pressure receiving face to which said signal pressure is applied in one direction;

a second pressure receiving face to which the oil pressure supplied from said pressure governing valve to said control valve is applied in another direction; and a third pressure receiving face to which the oil pressure supplied from said control valve to said second hydraulic servo is applied in one direction.

5. The oil pressure controller of the automatic transmission according to claim 4, wherein said pressure governing valve comprising:
   a plunger on which said first and third pressure receiving faces are created;
   a spool disposed coaxially with said plunger and on which said second pressure receiving face is created;
   a first elastic member disposed between said plunger and said spool; and
   a second elastic member disposed coaxially on the opposite side from said first elastic member at said plunger.

6. The oil pressure controller of the automatic transmission according to claim 1, wherein said first hydraulic servo is supplied with the oil pressure in a first gear shifting step and engages a frictional engaing element which is to be engaged in the first gear shifting step;
   said second hydraulic servo is supplied with the oil pressure in a second gear shifting step which is different from the first gear shifting step and engages a frictional engaing element which is to be engaged in the second gear shifting step; and
   said directional control valve is a gear shift control valve for changing over said first gear shifting step and second gear shifting step.

* * * * *